(12) United States Patent
Ferguson

(10) Patent No.: US 6,975,776 B2
(45) Date of Patent: Dec. 13, 2005

(54) PREDICTING HUMAN VISION PERCEPTION AND PERCEPTUAL DIFFERENCE

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 566 days.

(21) Appl. No.: 10/076,853

(22) Filed: Feb. 14, 2002

(65) Prior Publication Data

US 2003/0152284 A1 Aug. 14, 2003

(51) Int. Cl.[7] .............................................. G06K 9/40
(52) U.S. Cl. ...................................... 382/260; 382/275
(58) Field of Search ............................... 382/260–265, 382/274, 275, 324

(56) References Cited

U.S. PATENT DOCUMENTS

| | | | |
|---|---|---|---|
| 4,918,633 A | * | 4/1990 | Sullivan ...................... 382/275 |
| 5,887,084 A | * | 3/1999 | Wober et al. ................ 382/250 |
| 5,940,124 A | * | 8/1999 | Janko et al. ................. 348/189 |
| 6,137,904 A | * | 10/2000 | Lubin et al. ................. 382/162 |

OTHER PUBLICATIONS

Oh et al., A Multistage Perceptual Quality Assesment for Compressed Digital Angiogram Images, Dec. 2001, Medical Imaging, IEEE Transactions on, vol. 20, Issue 12, pp. 1352-1361.*

* cited by examiner

Primary Examiner—Bhavesh M. Mehta
Assistant Examiner—Dennis Rosario
(74) Attorney, Agent, or Firm—Francis I. Gray

(57) ABSTRACT

An apparatus and method for predicting human vision perception and perceptual differences provides a perceptual difference model that merges two human vision systems, one for a reference video signal and the other for an impaired version of the reference video signal. The respective video signals are processed by spatio-temporal filters and, prior to differencing, by noise masking modules that apply a noise mask as a function of pupil size and luminance. The differenced filtered signal is an initial perceptual difference map to which other masking is applied to take into account correlation and contrast gain based upon the noise masks and filtered luminance from the spatio-temporal filters. The result is a more precise output perceptual difference map.

13 Claims, 2 Drawing Sheets

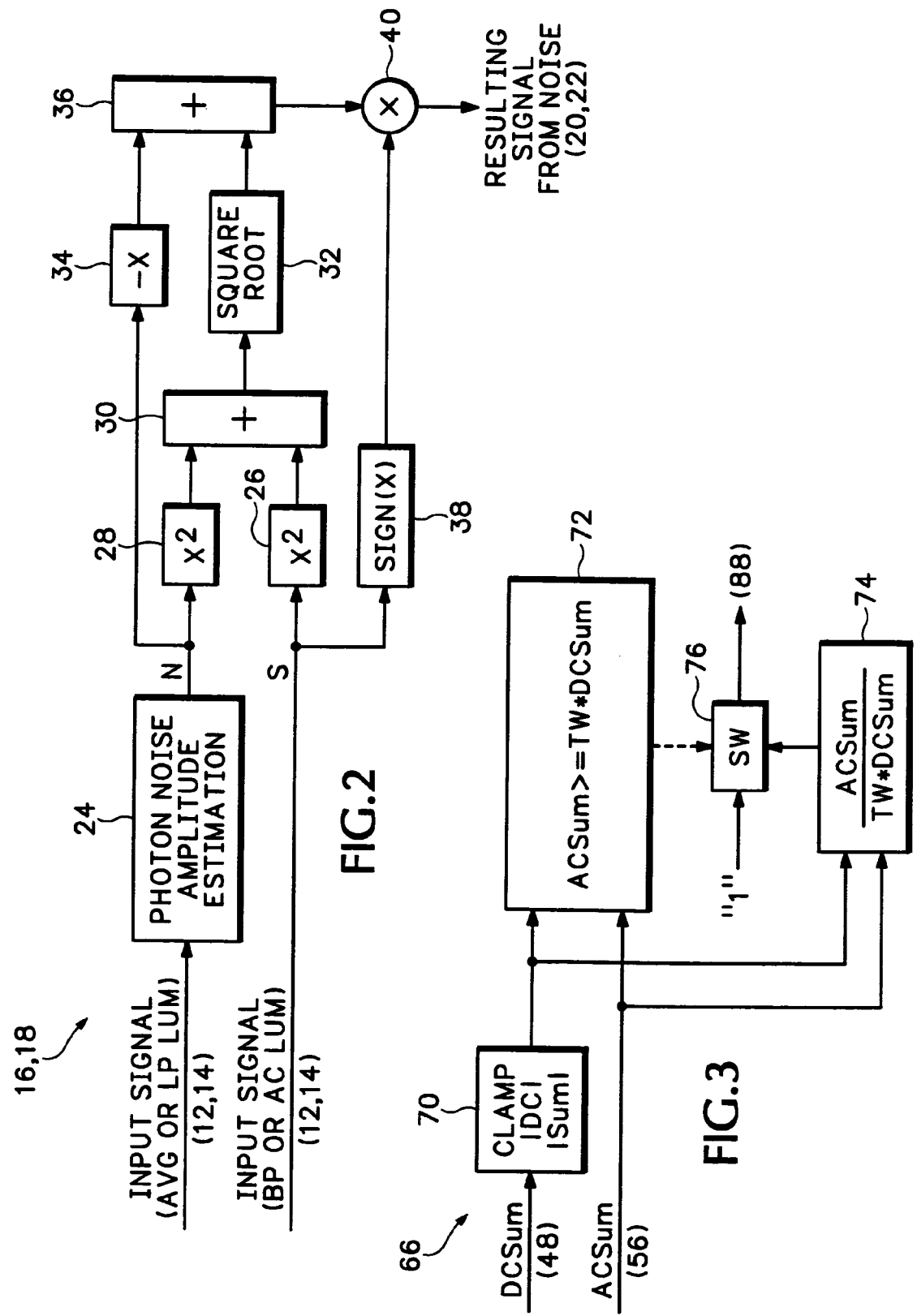

PREDICTING HUMAN VISION PERCEPTION AND PERCEPTUAL DIFFERENCE

BACKGROUND OF THE INVENTION

The present invention relates to video quality of service, and more particularly to an improvement in predicting human vision perception and perceptual difference for video quality metrics using masking to take into consideration pupil size variation and other effects.

The problem addressed by the present invention is predicting subjective quality ratings of video that has been processed in such a way that visually detectable impairments may be present. Human vision perceptual models have been shown to be instrumental in the solution to this problem by predicting perceptibility of impairments. See U.S. Pat. No. 6,678,424 entitled "Realtime Human Vision System Behavioral Modeling" and U.S. Patent Application Publication No. 2003/0053698 A1 entitled "Temporal Processing for Realtime Human Vision System Behavior Modeling", both by the present inventor. These documents describe two merged human vision systems, one for a reference video signal and the other for an impaired video signal, as a perceptual difference model. The model has filter pairs, each having a two-dimensional lowpass filter and an implicit high pass filter, and the outputs are differenced to produce an impaired image map which is further processed to produce a measure for picture quality of the impaired video signal relative to the reference video signal. The filters are primarily responsible for variations in human vision response over spatial and temporal frequencies—spatiotemporal response. Such filters may be adaptive, as described in pending U.S. Patent Application Publication Nos. 2002/0186894 A1 entitled "Adaptive Spatio-Temporal Filter for Human Vision System Models" and 2003/0031281 A1 entitled "Variable Sample Rate Recursive Digital Filter", both by the present inventor. The adaptive filters have two paths, a center path and a surround path, for processing an input video signal, each path having a temporal and spatial component. A controller determines adaptively from the input video signal or one of the path outputs the coefficients for the filter components. The difference between the path outputs is the adaptive filter output for the input video signal.

The filters take into account most of the effects of lens and pupil related optical modulation transfer function (MTF), lateral inhibition, aggregate temporal response of photoreceptors, neurons, etc., and adaptation of pupil, neurons, including dark adaptation, etc. Although this model does change spatial and temporal frequency response due to pupil changes, it does not take into consideration the effects of noise masking changes due to pupil changes in response to changes in luminance, and does not consider other adaptation due to similarity (correlation) between test and reference signals, luminance sensitivity including the equivalent of luminance portion of contrast gain control or spatiotemporal effects of the variance or AC portion of contrast gain control.

What is desired is an improved method of masking for predicting human vision perception and perceptual difference in order to produce a more accurate prediction of subjective quality ratings of video.

BRIEF SUMMARY OF THE INVENTION

Accordingly the present invention provides a method and apparatus for predicting human vision perception and perceptual difference by merging two human vision systems into a perceptual difference model that includes noise masking based on photon noise and other masking for correlation, luminance sensitivity and variance effects. Each human vision system has a spatio-temporal filter that processes the respective reference and impaired video signals to provide filtered outputs that are differenced to obtain an initial perceptual difference map. Prior to the differencing a noise masking module is applied to each filter output which takes into account pupil size vs. luminance. The noise masking modules perform a photon noise amplitude estimation based on a filtered luminance output from the filters, the resulting noise signal being used to mask the filtered output signal to produce the filtered outputs that are differenced. The initial perceptual difference map may then be subjected to other masking for correlation and contrast gain based on the filtered luminance outputs, the noise masking outputs and various masking parameters to produce an output perceptual difference map and derivative summary measures. The perceptual difference model summary measures are calibrated to adjust the various masking parameters by applying known stimuli from the literature used for subjective human vision modeling and comparing the results with the literature results. The parameters are adjusted to produce an approximate match with the literature results in response to many stimuli.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 2. is a block diagram view of a noise masking module for the perceptual difference model according to the present invention.

FIG. 3 is a block diagram view of an area threshold module for the perceptual difference model according to the present invention.

DETAILED DESCRIPTION OF THE INVENTION

Figure 1:
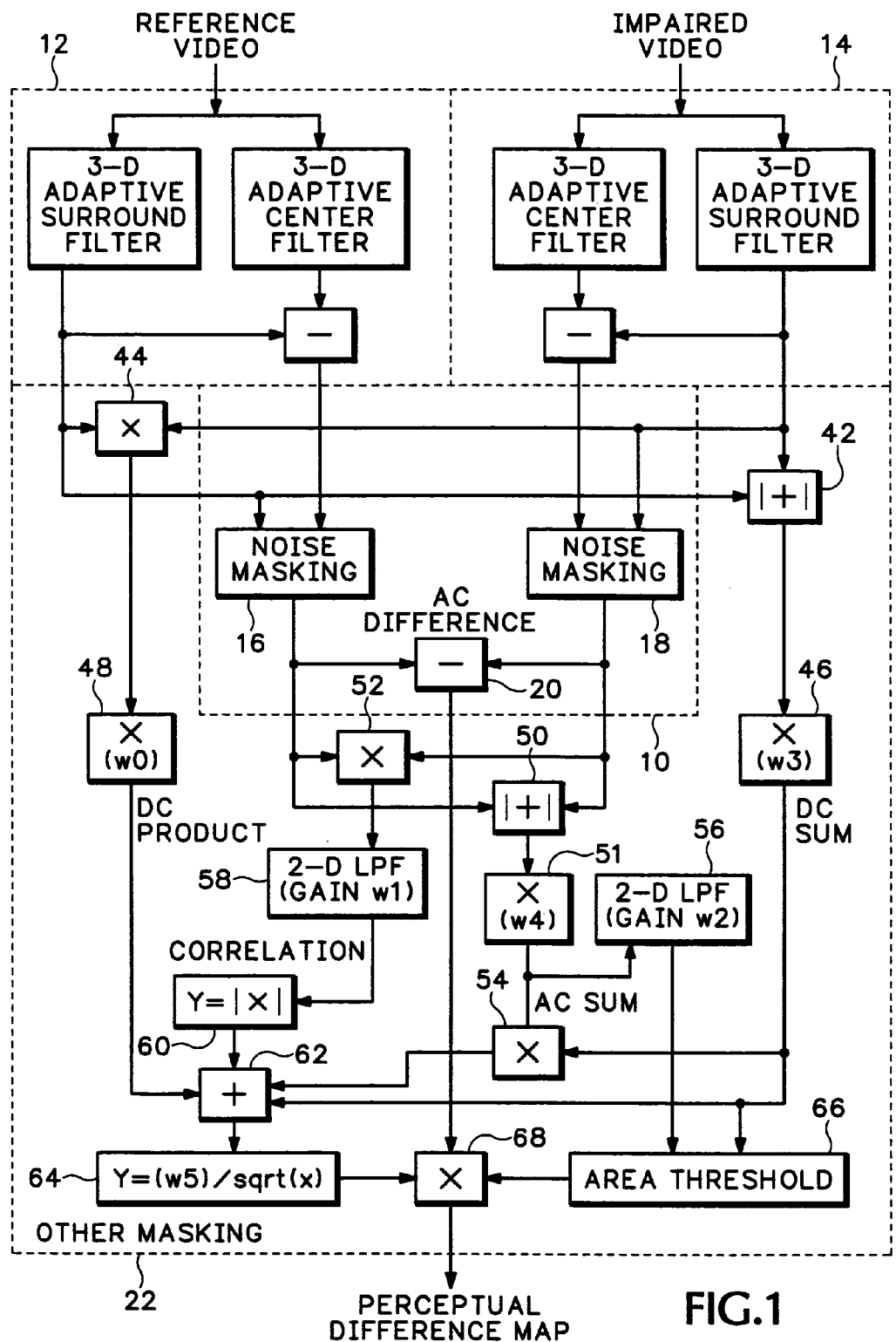
FIG. 1 is a block diagram view of a perceptual difference model according to the present invention.

Referring now to FIG. 1 a perceptual difference model with masking 10 is shown using two merged human vision systems. Each human vision system receives a video input signal, either a reference video signal or an impaired video signal, that is processed by respective adaptive filters 12, 14, which filters may be like those described in the above-mentioned pending U.S. Patent Application Publication No. 2002/0186894 A1 entitled "Adaptive Spatio-Temporal Filter for Human Vision System Models" (the filter adaptation controller not being shown). The respective outputs of the filters 12, 14 are input to respective noise masking modules 16, 18 together with an output of the filters that is predominately average or lowpass (temporally and spatially) luminance in nature. The outputs of the noise masking modules 16, 18 are input to a subtractor 20 to produce an "AC Difference" signal, which is an initial perceptual difference map. The local mean or lowpass luminance filter output from the filters 12, 14, the output from the noise masking modules 16, 18 and the AC Difference signal are input to an Other Masking module 22, as described further below.

One of the noise masking modules 16, 18 is shown in further detail in FIG. 2. The output from the filter 12, 14 that is predominately lowpass and bandpass luminance in nature is input to a photo noise amplitude estimation module 24 to produce a noise signal N representative of photon noise, which is described further below. The output from the filter 12, 14 that is the filtered output S is input to a first squarer 26, while the noise signal N is input to a second squarer 28. The outputs from the squarers 26, 28 are summed (30) and then input to a square root module 32. The noise signal N is negated (34) and input to a summer 36 together with the output from the square root module 32. The resulting output from the summer 36 is the square root of the sum of the squares less the noise signal, i.e., $Y=\{SQRT(S^2+N^2)-N\}$. The sign of the input filtered signal S is extracted (38) and used to multiply (40) the output of the summer 36 to produce a resulting signal from the noise for input to the subtractor 20 and the Other Masking module 22.

Photon noise is a function of pupil diameter and retinal illuminance. Pupil diameter and retinal illuminance are interdependent, and solving for both as a function of the luminance of an image that reaches the pupil involves in a recursive manner matching the relationship of retinal illuminance vis a vis luminance with the relationship of pupil size vis a vis retinal illuminance using data points taken from literature, such as "Vision: Human and Electronic" by Albert Rose, David Sarnoff Research Center, RCA, Plenum Press, NY/London, 1973, page 30. Based upon this process it was determined that the photon noise may be approximated with a simple piecewise exponential:

$$\text{NoiseAmpMode}(lum):=if(lum<1, lum^{y1}, lum^{y2})*K$$

where K:=6.2 y1:=0.375 y2:=0.285. K represents photon noise sensitivity. Therefore the photon noise amplitude estimation module 24 uses the above equation to determine from the filtered luminance signal the noise signal N. Since this equation is based upon the pupil size, the noise signal N also takes into account pupil size.

The Other Masking module 22, as shown in FIG. 1, takes the absolute sum (42) and product (44) of the lowpass filtered luminance signal from the two human vision systems and applies respective weighting functions w3, w0 (46, 48) to produce "DC Sum" and "DC Product" signals. Likewise the outputs from the respective noise masking modules 16, 18 are also absolutely summed (50) and multiplied together (52). The absolute value of the summed output of the noise masking modules 16, 18 is weighted (51) by a weighting factor w4, which may be omitted if w4=1, and then (54) by the DC Sum as well as being input to a two-dimensional lowpass filter 56, the lowpass filter having a given gain w2. The product output of the noise masking modules 16, 18 is input to another two-dimensional lowpass filter 58 having a given gain w1, the output of which is converted (60) to an absolute value as a local "Correlation" signal. The DC Product, the DC Sum, the Correlation and the weighted AC Sum signals are summed (62) and input to an inverse square root module 64 having a given weighting factor w5. The DC Sum signal and the output from the impaired lowpass filter 56 are input to an area threshold module 66 which compensates for the size of the area over which an impairment is discerned. The AC Difference signal, the output from the inverse square root module 64 and the output from the area threshold module 66 are multiplied together (68) to produce an output perceptual difference map.

As shown in FIG. 3 in the area threshold module 66 the DC Sum signal is clamped (70) to provide an absolute value. The absolute DC Sum signal and the AC Sum signal from the 2-D lowpass filter 56 are input to a comparator 72 and to a calculation module 74. In the comparator 72 the AC Sum signal is compared to the DC Sum signal as modified by a threshold weight (TW), and in the calculation module 74 the quantity ACSum/(TW*DCSum) is computed. The output from the comparator 72 controls a switch 76 which has as inputs a logical "1" and the output from the calculation module 74. The output from the switch 76 is "1" if ACSum≧DCSum*TW and is ACSUM/(TW*DCSum) if ACSum<DCSUM*TW. TW is the inverse of the gain w2 of the 2-D lowpass filter 56.

The next step is to calibrate the perceptual difference model to determine appropriate values for the various parameters. This includes parameters for the filters 12, 14, for the noise masking modules 16, 18 and for the other masking module 22. Particularly for the other masking module 22, w0 represents luminance product masking weight, w3 represents luminance sum masking weight, w1 represents reference and impaired local correlation masking weight, w2 represents filtered AC threshold for unaffected due to area, and w5 represents overall system gain. Other parameters are: for correlation masking a local correlation lowpass filter pole, for supra-threshold "self-masking" a reference and test contrast envelope masking weight w4 (set to one for this example); and for area thresholding a local reference and impaired contrast envelope lowpass filter pole. For the calibration a number of simulations are performed to assess how well the perceptual difference model behavior matches human subjective behavior recorded in various experiments documented in the literature. Experiments are chosen based on the combination of two factors:

the deviation from transparent (linear, all pass) response shown the relevance of stimulus response for video applications under consideration.

Although there is a great deal of overlap, classes of experiments may be roughly categorized as spatiotemporal contrast threshold contrast discrimination and other "masking" related spatial supra-threshold temporal supra-threshold Each of these may vary any or all of the related parameters described above in combination with luminance, size, contrast and duration of target and/or masker. The threshold data is used to calibrate the perceptual difference model for approximately least mean square error (LMSE) in response relative to 0.1, per M. Cannon, "A Multiple Spatial Filter Model for Suprathreshold Contrast Perception" in *Vision Models for Target Detection and Recognition*, ed. Eli Peli (World Scientific Publishing, River Edge, N.J. 1995), pages 245–283. The spatial supra-threshold data are used to calibrate the model for approximately the values given in the Cannon reference, while equal contrast contours of Eli Peli et al, "Contrast Perception Across Changes in Luminance and Spatial Frequency" J. Opt. Soc. Am., October 1996, Vol. 13, No. 10 pages 1953–1959, are matched against equivalent contrast from the Cannon reference. The temporal suprathreshold data is relative and at this time is normalized and checked for correlation, as no common scale related to other data sets was determined by Lawrence E. Marks "Apparent Depth of Modulation as a Function of Frequency and Amplitude of Temporal Modulations of Luminance" J. Opt. Soc. Am. July 1970, Vol. 60, No. 7, pages 970–977. Calibration is an iterative process. Model responses for all the calibration stimuli are compared against the ideal responses from the literature. Calibration parameters are adjusted to minimize error.

In other words reference and/or impaired video signals used by the researchers reporting in the literature in determining human visual perception responses are applied to the perceptual difference model and the output is compared with the reported results of the human subjective tests. The parameters are adjusted to achieve a minimum LSME. This is repeated for other reference and/or impaired video signals used by other researchers. After many iterations the set of parameters that produces the minimum LSME across all the stimuli tests is determined to be those for use in the perceptual difference model. Where the literature does not provide both reference and impaired video signals, an appropriate match to the supplied video signal is generated so the perceptual difference model has both reference and impaired video signal inputs. The match is typically a constant or "flat field" at the same average luminance level.

Thus the present invention provides an apparatus and method for predicting human vision perception and perceptual difference that uses a perceptual difference model which merges two human vision systems, one for a reference video signal and the other for an impaired version of the reference video signal, uses a noise masking module as part of the human vision system that takes into account pupil size (photon noise), and uses other masking to account for correlation between reference and impaired video signals as well as the components of contrast gain control, the various parameters for the perceptual difference model being calibrated using human subjective test data from existing literature in an iterative process.

What is claimed is:

1. A perceptual difference model using a pair of human vision systems, one for a reference video signal and the other for an impaired version of the reference video signal, each human vision system having a spatio-temporal filter receiving the respective video signal, the outputs of which are differenced to obtain an initial perceptual difference map, further comprising means for noise masking the output of each spatio-temporal filter to account for photon noise based on the relation of pupil size to luminance prior to obtaining the initial perceptual difference map.

2. The perceptual difference model as recited in claim 1 further comprising means for masking the initial perceptual difference map as a function of the outputs of the noise masking means and filtered luminance outputs from the spatio-temporal filters to account for correlation and contrast gain control to produce an output perceptual difference map from the initial perceptual difference map.

3. The perceptual difference model as recited in claim 2 wherein the masking means comprises:
 means for obtaining an absolute noise masked sum value and a noise masked product value from the outputs of the noise masking means;
 means for generating a correlation value from the noise masked product value;
 means for obtaining an absolute luminance sum value and a luminance product value from the filtered luminance outputs;
 means for combining the absolute noise masked sum value, the correlation value, the absolute luminance sum value and the luminance product value to produce a contrast gain mask;
 means for generating an area threshold mask from the absolute noise masked sum value and the absolute luminance sum value; and
 means for adjusting the initial perceptual difference map with the area threshold mask and the contrast gain mask to produce an output perceptual difference map.

4. The perceptual difference model as recited in claim 2, or 3 wherein each noise masking means comprises:
 means for obtaining a photon noise amplitude estimation as a noise signal based on the relation of pupil size to luminance from the filtered luminance output of the corresponding spatio-temporal filter; and
 means for generating a noise masked signal from the noise signal and the output of the spatio-temporal filter as a source signal, the generating means being a function of the square root of the sum of the squares of the noise signal and the source signal less the noise signal, the respective noise masked signals being differenced to obtain the initial perceptual difference map.

5. A perceptual difference model using a pair of human vision systems, one for a reference video signal and the other for an impaired version of the reference video signal, each human vision system having a spatio-temporal filter receiving the respective video signal, the outputs of which are differenced to obtain an initial perceptual difference map, further comprising means for masking the initial perceptual difference map as a function of the outputs of the spatio-temporal filters and filtered luminance outputs from the spatio-temporal filters to account for correlation and contrast gain control to produce an output perceptual difference map from the initial perceptual difference map.

6. The perceptual difference model as recited in claim 5 wherein the masking means comprises for each pixel at each time sample:
 means for obtaining an absolute filtered sum value and a filtered product value from the outputs of the spatio-temporal filters;
 means for generating a correlation value from the filtered product value;
 means for obtaining an absolute luminance sum value and a luminance product value from the filtered luminance outputs;
 means for combining the absolute filtered sum value, the correlation value, the absolute luminance sum value and the luminance product value to produce a contrast gain mask;
 means for generating an area threshold mask from the absolute filtered sum value and the absolute luminance sum value; and
 means for adjusting the initial perceptual difference map with the area threshold mask and the contrast gain mask to produce an output perceptual difference map.

7. A method of generating an output perceptual difference map from a reference video signal and an impaired version of the reference video signal using a perceptual difference model that merges a pair of human vision systems, one for the reference video signal and the other for the impaired video signal, each human vision system having a spatio-temporal filter receiving the respective video signal, the outputs of which are differenced to obtain an initial perceptual difference map, further comprising the step of noise masking the output of each spatio-temporal filter to account for photon noise based on the relation of pupil size to luminance prior to obtaining the initial perceptual difference map as the output perceptual difference map.

8. The method as recited in claim 7 further comprising the step of masking the initial perceptual difference map as a function of the outputs of the noise masking step and filtered luminance outputs from the spatio-temporal filters to account for correlation and contrast gain control to produce the output perceptual difference map from the initial perceptual difference map.

9. The method as recited in claim 8 wherein the masking step comprises the steps of:
   obtaining an absolute noise masked sum value and a noise masked product value from the outputs of the noise masking step;
   generating a correlation value from the noise masked product value;
   obtaining an absolute luminance sum value and a luminance product value from the filtered luminance outputs;
   combining the absolute noise masked sum value, the correlation value, the absolute luminance sum value and the luminance product value to produce a contrast gain mask;
   generating an area threshold mask from the absolute noise masked sum value and the absolute luminance sum value; and
   adjusting the initial perceptual difference map with the area threshold mask and the contrast gain mask to produce the output perceptual difference map.

10. The method as recited in claim 7, 8 or 9 wherein each noise masking step comprises the steps of:
   obtaining a photon noise amplitude estimation as a noise signal based on the relation of pupil size to luminance from the filtered luminance output of the corresponding spatio-temporal filter; and
   generating a noise masked signal from the noise signal and the output of the spatio-temporal filter as a source signal, the generating means being a function of the square root of the sum of the squares of the noise signal and the source signal less the noise signal, the respective noise masked signals being differenced to obtain the initial perceptual difference map.

11. A method of generating an output perceptual difference map from a reference video signal and an impaired version of the reference video signal using a perceptual difference model that merges a pair of human vision systems, one for the reference video signal and the other for the impaired video signal, each human vision system having a spatio-temporal filter receiving the respective video signal, the outputs of which are differenced to obtain an initial perceptual difference map, further comprising the step of masking the initial perceptual difference map as a function of the outputs of the spatio-temporal filters and filtered luminance outputs from the spatio-temporal filters to account for correlation and contrast gain control to produce the output perceptual difference map from the initial perceptual difference map.

12. The method as recited in claim 11 wherein the masking step comprises the steps of:
   obtaining an absolute filtered sum value and a filtered product value from the outputs of the spatio-temporal filters;
   generating a correlation value from the filtered product value;
   obtaining an absolute luminance sum value and a luminance product value from the filtered luminance outputs;
   combining the absolute filtered sum value, the correlation value, the absolute luminance sum value and the luminance product value to produce a contrast gain mask;
   generating an area threshold mask from the absolute filtered sum value and the absolute luminance sum value; and
   adjusting the initial perceptual difference map with the area threshold mask and the contrast gain mask to produce the output perceptual difference map.

13. The method as recited in claim 8, 9, 11 or 12 further comprising the step of calibrating the perceptual difference model in response to known reference and impaired video signal stimuli by adjusting various parameters of the otherwise masking step so that the output perceptual difference map approximately matches known results for the known reference and impaired video signal stimuli.

\* \* \* \* \*